US012046789B1

(12) United States Patent
Liao et al.

(10) Patent No.: US 12,046,789 B1
(45) Date of Patent: Jul. 23, 2024

(54) FERROELECTRIC FILM PHASE SHIFTER AND WAFER-LEVEL PHASED ARRAY CHIP SYSTEM

(71) Applicant: Xidian University, Xi'an (CN)

(72) Inventors: Jiajia Liao, Xi'an (CN); Min Liao, Xi'an (CN); Maliang Liu, Xi'an (CN); Ziyu Wang, Xi'an (CN); Yunpeng Li, Xi'an (CN); Yichun Zhou, Xi'an (CN)

(73) Assignee: XIDIAN UNIVERSITY, Xi'an (CN)

( * ) Notice: Subject to any disclaimer, the term of this patent is extended or adjusted under 35 U.S.C. 154(b) by 0 days.

(21) Appl. No.: 18/648,408

(22) Filed: Apr. 28, 2024

(30) Foreign Application Priority Data

May 4, 2023 (CN) ......................... 202310492361.1

(51) Int. Cl.
*H01P 1/18* (2006.01)
*H01P 11/00* (2006.01)

(52) U.S. Cl.
CPC .............. *H01P 1/181* (2013.01); *H01P 1/184* (2013.01); *H01P 11/00* (2013.01)

(58) Field of Classification Search
CPC .. H01P 1/18; H01P 1/181; H01P 1/182; H01P 1/183; H01P 1/184; H01P 1/19; H01P 11/00
See application file for complete search history.

(56) References Cited

U.S. PATENT DOCUMENTS

2010/0090780 A1* 4/2010 Song ....................... H01P 1/184 333/161
2013/0249653 A1* 9/2013 Ferrari .................... H01P 1/184 333/238
2020/0075491 A1* 3/2020 Dogiamis ......... H01L 23/49822
2024/0021667 A1* 1/2024 Hou .................... H01L 23/5226
2024/0088204 A1* 3/2024 Yu ........................... H01L 28/40

OTHER PUBLICATIONS

CNIPA, Notification of First Office Action for CN202310492361.1, Nov. 15, 2023.

(Continued)

*Primary Examiner* — Stephen E. Jones
(74) *Attorney, Agent, or Firm* — Zhigang Ma

(57) ABSTRACT

A ferroelectric film phase shifter includes a substrate layer; an isolated signal layer located on the substrate layer; first, second and third top transmission line electrodes distributed on the isolated signal layer at intervals; the first and second top transmission line electrodes located at both ends of the isolated signal layer, and the third top transmission line electrode located on a middle region of the isolated signal layer; a bottom transmission line electrode located in the isolated signal layer; an intermediate transmission line structure located in a middle region of the bottom transmission line electrode and adjacent to the third top transmission line electrode; MIM hafnium oxide-based ferroelectric capacitor structures located at two ends of the bottom transmission line electrode; and metal transmission line structures located between each MIM hafnium oxide-based ferroelectric capacitor structure and each of the first top transmission line electrode and the second top transmission line electrode.

12 Claims, 7 Drawing Sheets

(56) References Cited

OTHER PUBLICATIONS

Xidian University (Applicant), Reply to Notification of a First Office Action for CN202310492361.1, w/ replacement claims, Nov. 20, 2023.
Xidian University (Applicant), Supplemental Reply to Notification of a First Office Action for CN202310492361.1, w/ (allowed) replacement claims, Nov. 24, 2023.
CNIPA, Notification to grant patent right for invention in CN202310492361.1, Nov. 30, 2023.

* cited by examiner

FERROELECTRIC FILM PHASE SHIFTER AND WAFER-LEVEL PHASED ARRAY CHIP SYSTEM

TECHNICAL FIELD

The disclosure relates to the field of semiconductor technologies, and more particularly to a ferroelectric film phase shifter and a wafer-level phased array chip system.

BACKGROUND

Phased array technology has the characteristics of fast scanning, multi-beam, anti-interference and low weight, which is of revolutionary significance to radar, satellite communication and other fields. The development of science and technology not only requires a phased array system to have higher radio frequency (RF) characteristics, but also puts forward higher requirements for its size weight and power consumption (SWaP).

Compared with the existing multilayer printed circuit board (PCB) phased array and system in package (SiP) phased array, the integrated wafer-level phased array technology based on complementary metal oxide semiconductor (CMOS) technology shows significant advantages in array scale, integrated level, transceiver efficiency and assembly difficulty. This also puts forward more stringent requirements for the most used signal processing component, that is, a wafer-level phase shifter. Existing wafer-level phase shifters include: active phase shifters based on current drive; passive phase shifters including micro-electro-mechanical systems (MEMS) phase shifters, ferrite phase shifters, semiconductor diode phase shifters and gallium arsenide (GaAs) field effect transistor phase shifters; and ferroelectric film passive phase shifters.

However, the existing wafer-level phase shifters have the following problems.

(1) The use of active phase shifter based on a current switching device has problems of high thermal density, high power consumption and high cost in large-scale and high-density integration due to its current-driven operating mechanism.

(2) The use of the passive phase shifters including the MEMS phase shifters, the ferrite phase shifters, the semiconductor diode phase shifters and the GaAs field effect transistor phase shifters can solve the limitation of power consumption, but these devices have the disadvantages of large insertion loss and low accuracy at high frequency.

(3) The ferroelectric film passive phase shifters are used. The dielectric material used for the ferroelectric phase shifter is usually barium strontium titanate $Ba_xSr_{1-x}TiO_3$ (BST). As a thickness of the film is reduced to sub-hundred nanometers, the ferroelectric performance will drop sharply, so the working voltage is usually tens of volts, which is incompatible with the working voltage of silicon-based CMOS devices. In addition, the preparation process of the BST ferroelectric films has high preparation and crystallization temperatures, and is poorly compatible with CMOS processes. At present, the ferroelectric film phase shifters based on traditional ferroelectric materials, such as BST, are usually integrated by soldering discrete chips to PCB, and there are problems such as communication delay caused by various parasitic capacitances and long-distance metal interconnection, which is not conducive to the development of miniaturized and lightweight systems.

SUMMARY

In order to solve the above problems in the related art, the disclosure provides a ferroelectric film phase shifter (also referred to as ferroelectric thin film phase shifter) and a wafer-level phased array chip system. The technical problem to be solved by the disclosure is realized by the following technical solutions.

In a first aspect, an embodiment of the disclosure provides a ferroelectric film phase shifter, including: a substrate layer, an isolated signal layer, a first top transmission line electrode, a second top transmission line electrode, a third top transmission line electrode, a bottom transmission line electrode, an intermediate transmission line structure, multiple metal-insulator-metal (MIM) hafnium oxide-based ferroelectric capacitor structures, and multiple metal transmission line structures.

The isolated signal layer is located on the substrate layer. The first top transmission line electrode, the second top transmission line electrode, and the third top transmission line electrode are distributed on the isolated signal layer at intervals. The first top transmission line electrode and the second top transmission line electrode are located on surfaces of two ends of the isolated signal layer, and the third top transmission line electrode is located on a surface of a middle region of the isolated signal layer. The bottom transmission line electrode is located in the isolated signal layer. The intermediate transmission line structure is located on a surface of a middle region of the bottom transmission line electrode and adjacent to the third top transmission line electrode. The multiple MIM hafnium oxide-based ferroelectric capacitor structures are distributed on surfaces of two ends of the bottom transmission line electrode and all located below the first top transmission line electrode and the second top transmission line electrode. The metal transmission line structures are located between the first top transmission line electrode and each of the multiple MIM hafnium oxide-based ferroelectric capacitor structures, and located between the second top transmission line electrode and each of the multiple MIM hafnium oxide-based ferroelectric capacitor structures.

In one embodiment of the disclosure, the isolated signal layer includes one selected from the group consisting of silicon dioxide, boron titanate, aluminum oxide, and silicon nitride, and a thickness of the isolated signal layer is in a range of 500 nanometers (nm) to 10 micrometers (μm).

In one embodiment of the disclosure, each of the multiple MIM hafnium oxide-based ferroelectric capacitor structures includes a first electrode layer, a hafnium oxide ferroelectric film layer and a second electrode layer stacked and distributed from bottom to top.

In one embodiment of the disclosure, electrode materials of the first electrode layer and the second electrode layer both include at least one of titanium nitride (TiN), tungsten (W), hafnium nitride (HfN), tantalum nitride (TaN), nickel (Ni) and ruthenium (Ru), and thicknesses of the first electrode layer and the second electrode layer are in a range of 10 nm to 100 nm. The hafnium oxide ferroelectric film layer is one of a doped hafnium oxide ferroelectric film and an undoped hafnium oxide ferroelectric film, and a doping material of the doped hafnium oxide ferroelectric film includes at least one selected from the group consisting of silicon, zirconium, aluminum, lanthanum, yttrium, cerium, nitrogen and prascodymium; a length and a width of the hafnium oxide ferroelectric film layer are both in a range of 500 nm to 2000 nm when viewed along a top view direction; and a thickness of the hafnium oxide ferroelectric film layer is in a range of 3 nm to 80 nm when viewed from front and side view directions.

In one embodiment of the disclosure, a phase shift response frequency of the MIM hafnium oxide-based ferroelectric capacitor structure is in a range of 1 hertz (Hz) to 0.1 terahertz (THz), and a working voltage of the MIM hafnium oxide-based ferroelectric capacitor structure is in a range of 0 to 3 volts (V).

In a second aspect, an embodiment of the disclosure provides a wafer-level phased array chip system, including: a base plate and a ferroelectric film phase shifter array. The base plate includes a silicon-based substrate, and a controller, an attenuator, a power divider and a multilayer metal wiring structure arranged on the silicon-based substrate and designed according to requirements of a phased array system. The ferroelectric film phase shifter array is located on the multilayer metal wiring structure, and the ferroelectric film phase shifter array is an array composed of multiple above-mentioned ferroelectric film phase shifters except the substrate layers.

In one embodiment of the disclosure, the multilayer metal wiring structure includes a top transmission line metal, a bottom transmission line metal, and multiple intermediate transmission line metals stacked and distributed at two end regions between the top transmission line metal and the bottom transmission line metal.

The power divider and the ferroelectric film phase shifter array are located at two end regions on the top transmission line metal.

The attenuator and the controller (also referred to as control unit) are located in a middle region of the bottom transmission line metal.

In one embodiment of the disclosure, the wafer-level phased array chip system is formed by a silicon-based complementary metal oxide semiconductor (CMOS) process line.

In one embodiment of the disclosure, an integration process temperature of each of the multiple MIM hafnium oxide-based ferroelectric capacitor structures in the ferroelectric film phase shifter array is not greater than 450° C.

In one embodiment of the disclosure, a phase shift response frequency of each of the multiple MIM hafnium oxide-based ferroelectric capacitor structures in the ferroelectric film phase shifter array is in a range of 1 Hz to 0.1 THz, and a working voltage of each of the multiple MIM hafnium oxide-based ferroelectric capacitor structures in the ferroelectric film phase shifter array is in a range of 0 to 3 V.

The disclosure has the beneficial effects as follows.

The ferroelectric film phase shifter provided by the disclosure is a novel wafer-level phase shifter structure, which includes the substrate layer, the isolated signal layer, the first top transmission line electrode, the second top transmission line electrode, the third top transmission line electrode, the bottom transmission line electrode, the intermediate transmission line structure, the multiple hafnium oxide-based ferroelectric capacitor structures, and the multiple metal transmission line structures. The isolated signal layer is located on the substrate layer. The first top transmission line electrode, the second top transmission line electrode and the third top transmission line electrode are distributed on the isolated signal layer at intervals, the first top transmission line electrode and the second top transmission line electrode are located on the surfaces of the two ends of the isolated signal layer, and the third top transmission line electrode is located on the surface of the middle region of the isolated signal layer. The bottom transmission line electrode is located in the isolated signal layer. The intermediate transmission line structure is located on the surface of the intermediate region of the bottom transmission line electrode and is adjacent to the third top transmission line electrode. The multiple MIM hafnium oxide-based ferroelectric capacitor structures are distributed on the surfaces of the two ends of the bottom transmission line electrode and are all located below the first top transmission line electrode and the second top transmission line electrode. The multiple metal transmission line structures are located between the first top transmission line electrode and each of the multiple MIM hafnium oxide-based ferroelectric capacitor structures, and between the second top transmission line electrode and each of the multiple MIM hafnium oxide-based ferroelectric capacitor structure. It can be seen that the ferroelectric film phase shifter proposed in the embodiment of the disclosure can realize wafer integration, and its preparation can be completely compatible with the existing CMOS process line. In addition, the MIM hafnium oxide-based ferroelectric capacitor structure has the advantages of low operating voltage, miniaturized film thickness, high high-frequency response speed and the like, which is beneficial to reducing the working voltage of the device, improving the device integration density and improving the device operating frequency band, and is of great significance to the development of phase shifter technology with large array, low power consumption, high precision and low loss.

The disclosure will be further described in detail with the attached drawings and embodiments.

DESCRIPTION OF REFERENCE NUMERALS

1—substrate layer; 2—isolated signal layer; 3—first top transmission line electrode; 4—second top transmission line electrode; 5—third top transmission line electrode; 6—bottom transmission line electrode; 7—intermediate transmission line structure; 8—metal-insulator-metal (MIM) hafnium oxide-based ferroelectric capacitor structure; 9—metal transmission line structure; 81—first electrode layer; 82—MIM hafnium oxide ferroelectric film layer; 83—second electrode layer; 10—silicon-based substrate; 20—multilayer metal wiring structure; 30—ferroelectric film phase shifter; 201—bottom transmission line metal; 202—top transmission line metal; 203—intermediate transmission line metal.

DETAILED DESCRIPTION OF EMBODIMENTS

The disclosure will be described in further detail with reference to specific embodiments, but the embodiments of the disclosure are not limited thereto.

Complementary metal oxide semiconductor (CMOS) wafer-level phased array with miniaturization, low weight and low power consumption is one of the core technologies of communication and radar systems, and phase shifter is the most widely used signal processing device in phased array. However, the existing CMOS wafer-level phased array has the problem of mutual restriction between power consumption and performance, that is, the wafer-level active phased array has the fatal problem of high power in large-scale integration because of its current-driven working principle, while the passive phased array with low power consumption and voltage-driven working principle has the problems of poor compatibility with silicon-based integrated circuits and high insertion loss at high frequency. Based on this, the disclosure aims to solve the problem that the working frequencies of the power consumption of the existing CMOS wafer-level phase shifter are mutually restricted.

Figure 1:
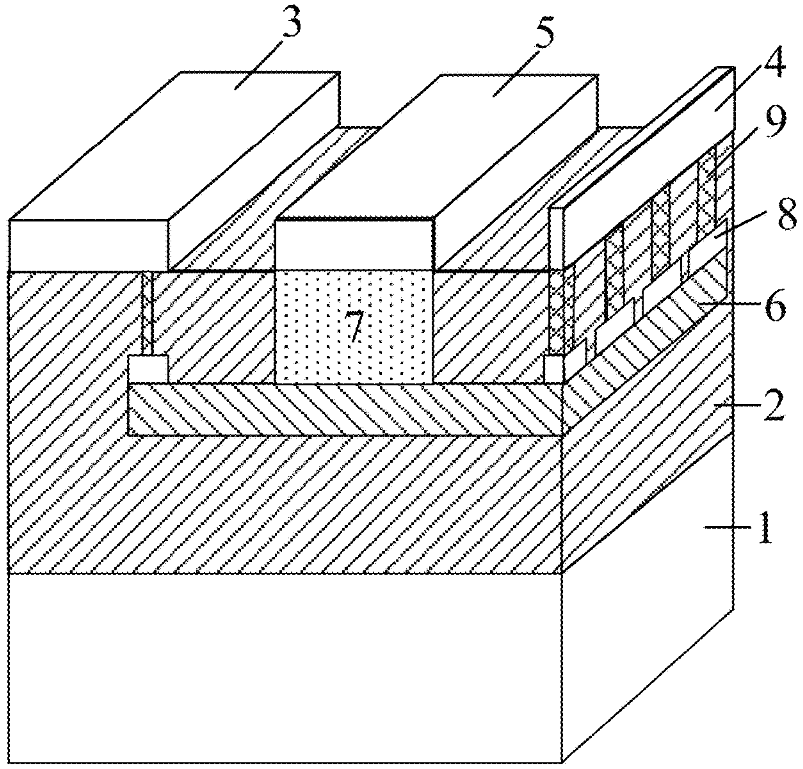
FIG. 1 illustrates a schematic diagram of a ferroelectric film phase shifter according to an embodiment of the disclosure.

In a first aspect, referring to FIG. 1, an embodiment of the disclosure provides a ferroelectric film phase shifter 30, which includes: a substrate layer 1, an isolated signal layer 2, a first top transmission line electrode 3, a second top transmission line electrode 4, a third top transmission line electrode 5, a bottom transmission line electrode 6, an intermediate transmission line structure 7, multiple metal-insulator-metal (MIM) hafnium oxide-based ferroelectric capacitor structures 8, and multiple metal transmission line structures 9. The isolated signal layer 2 is located on the substrate layer 1.

The first top transmission line electrode 3, the second top transmission line electrode 4 and the third top transmission line electrode 5 are distributed on the isolated signal layer 2 at intervals. The first top transmission line electrode 3 and the second top transmission line electrode 4 are located on surfaces of two ends of the isolated signal layer 2, and the third top transmission line electrode 5 is located on a surface of a middle region of the isolated signal layer 2.

The bottom transmission line electrode 6 is located in the isolated signal layer 2.

The intermediate transmission line structure 7 is located on a surface of a middle region of the bottom transmission line electrode 6 and is adjacent to the third top transmission line electrode 5.

The multiple MIM hafnium oxide-based ferroelectric capacitor structures 8 are distributed on surfaces of two ends of the bottom transmission line electrode 6 and are all located below the first top transmission line electrode 3 and the second top transmission line electrode 4.

The multiple metal transmission line structures 9 are located between the first top transmission line electrode 3 and each of the multiple MIM hafnium oxide-based ferroelectric capacitor structures 8, and between the second top transmission line electrode 4 and each of the multiple MIM hafnium oxide-based ferroelectric capacitor structures 8.

In an embodiment, the substrate layer 1 includes, but is not limited to, one of P-type monocrystalline silicon, gallium arsenide and sapphire, and has a thickness of 10 micrometers (μm) to 1000 μm.

In an embodiment, the isolated signal layer 2 is made of a material with low dielectric constant, including but not limited to one of silicon dioxide, boron titanate, aluminum oxide and silicon nitride, with a thickness of 100 nanometers (nm) to 1000 nm.

In an embodiment, materials of the first top transmission line electrode 3, the second top transmission line electrode 4, the bottom transmission line electrode 6, the intermediate transmission line structure 7 and the metal transmission line structures 9 all include, but are not limited to, at least one selected from the group consisting of gold, platinum, silver, titanium, copper, aluminum, iron and nickel, and all have a thickness of 50 nm to 1000 nm. The first top transmission line electrode 3 and the second top transmission line electrode 4 are both G signal transmission electrodes. The third top transmission line electrode 5 is an S signal transmission electrode.

In an embodiment, a thickness of each of the multiple MIM hafnium oxide-based ferroelectric capacitor structures 8 is in a range of 23 nm to 280 nm.

Figure 2A:
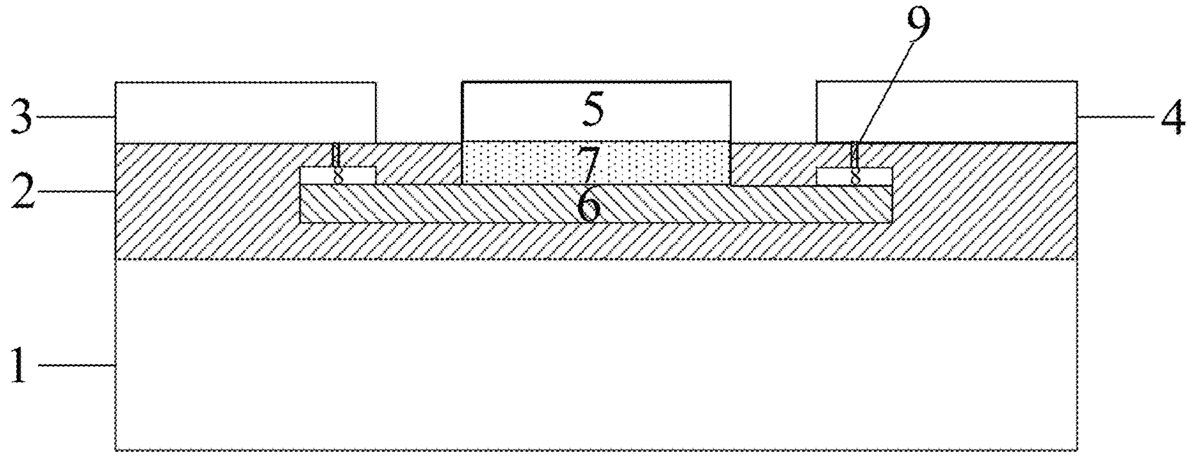
FIGS. 2A-2B illustrate schematic plan views of the ferroelectric film phase shifter along a front view direction according to the embodiment of the disclosure.
Figure 2B:
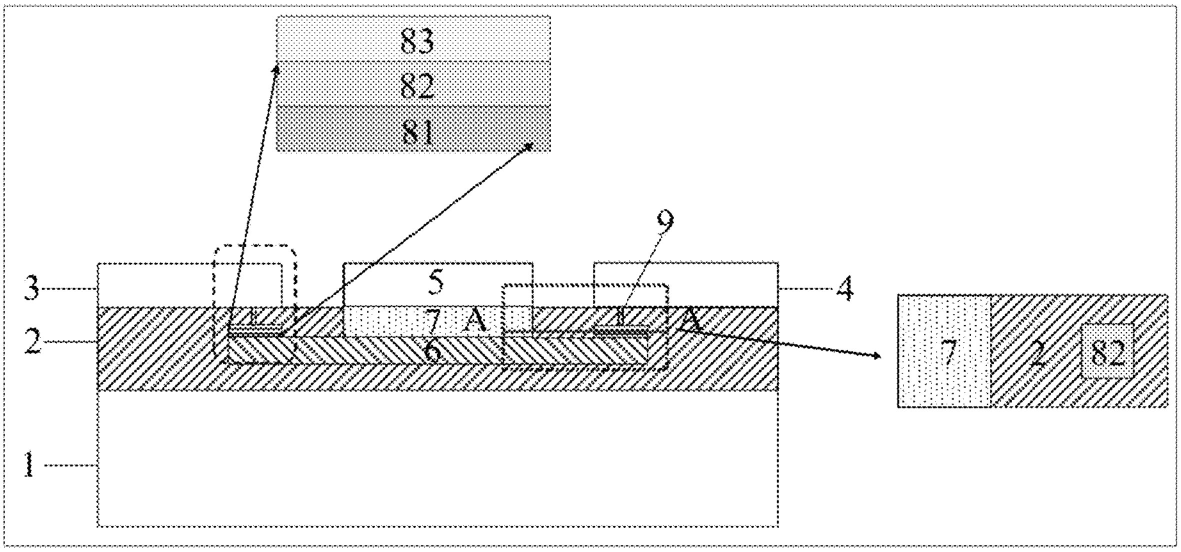

In an embodiment of the disclosure, FIG. 2A illustrates a schematic plan view of the ferroelectric film phase shifter along a front view direction, and FIG. 2B illustrates a schematic plan view of another ferroelectric film phase shifter along the front view direction. As shown by an upper enlarged portion of FIG. 2B, each MIM hafnium oxide-based ferroelectric capacitor structure 8 of the embodiment of the disclosure may include a first electrode layer 81, a MIM hafnium oxide ferroelectric film layer 82 and a second electrode layer stacked from bottom to top. As shown in an enlarged portion on a right side of FIG. 2B, it is a top view sectional view along a solid line A-A.

In an embodiment, electrode materials of the first electrode 81 layer and the second electrode 83 layer both include but are not limited to at least one selected from the group consisting of titanium nitride (TiN), tungsten (W), hafnium nitride (HfN), tantalum nitride (TaN), nickel (Ni) and ruthenium (Ru), with a thickness of 10 nm to 100 nm. The MIM hafnium oxide ferroelectric film layer 82 is a doped or undoped hafnium oxide ferroelectric film, and a doping material of the doped hafnium oxide ferroelectric film includes, but is not limited to, at least one selected from the group consisting of various elements such as silicon, zirconium, aluminum, lanthanum, yttrium, cerium, nitrogen, and prascodymium, which can induce hafnium oxide to form a ferroelectric phase. The MIM hafnium oxide ferroelectric film layer 82 has a length and width of 500 nm to 2000 nm when viewed along the top view direction; and the MIM hafnium oxide ferroelectric film layer 82 has a thickness of 3 nm to 80 nm when viewed along the front and side view directions. The MIM hafnium oxide ferroelectric film layer 82 of the embodiment of the disclosure has higher dielectric adjustment rate and lower dielectric loss, and can maintain characteristics and thermal stability at high frequency; and can be linearly phase adjusted by changing the dielectric constant of the material by changing the applied voltage.

According to the research of the inventor, the phase shift response frequency of the MIM hafnium oxide-based ferroelectric capacitor structure 8 proposed in the embodiment of the disclosure is in a range of 1 hertz (Hz) to 0.1 terahertz (THz), and the working voltage is in a range of 0-3 volts (V).

Figure 3A:
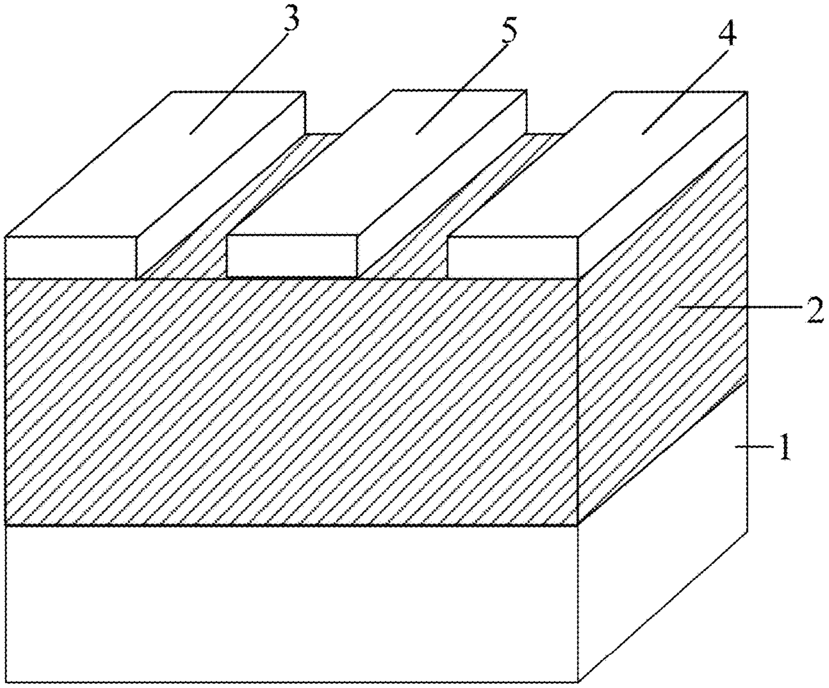
FIGS. 3A-3D illustrate schematic structural diagrams of the ferroelectric film phase shifter at different viewing angles according to the embodiment of the disclosure.
Figure 3B:
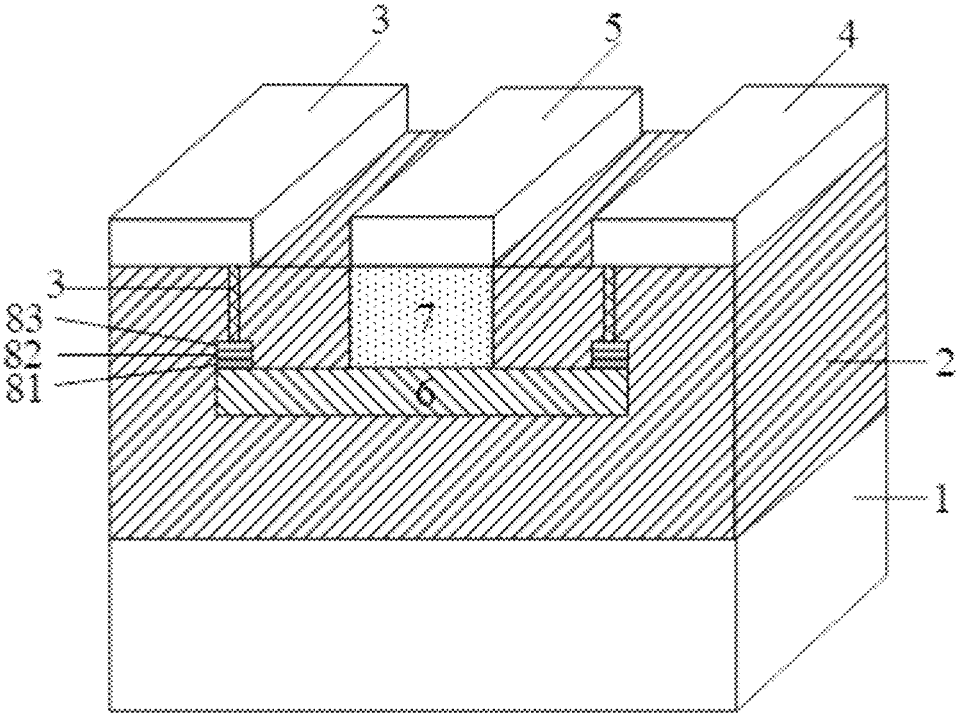
Figure 3C:
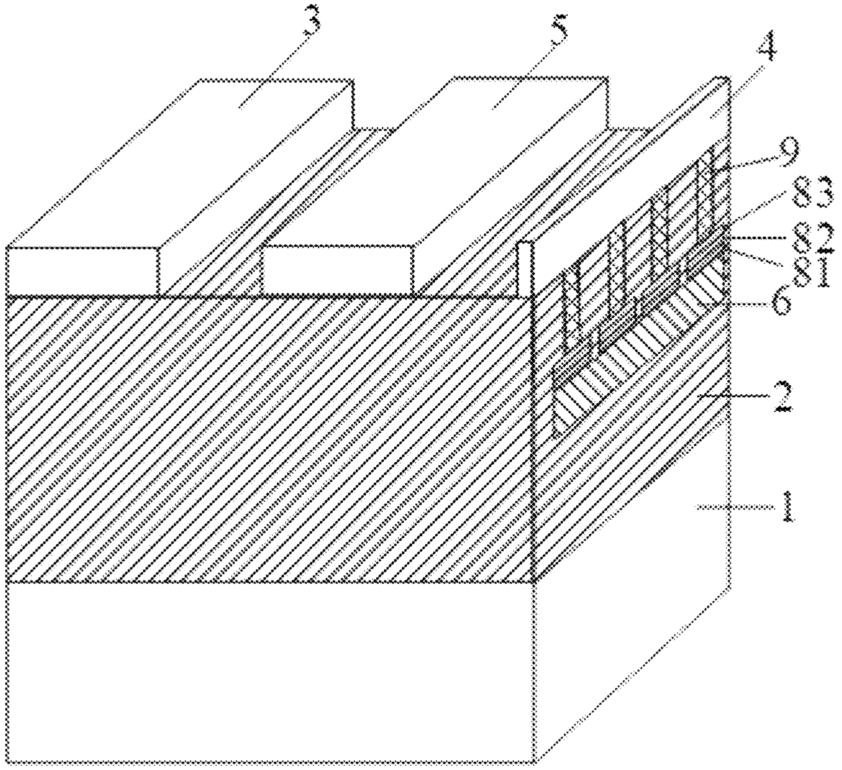
Figure 3D:
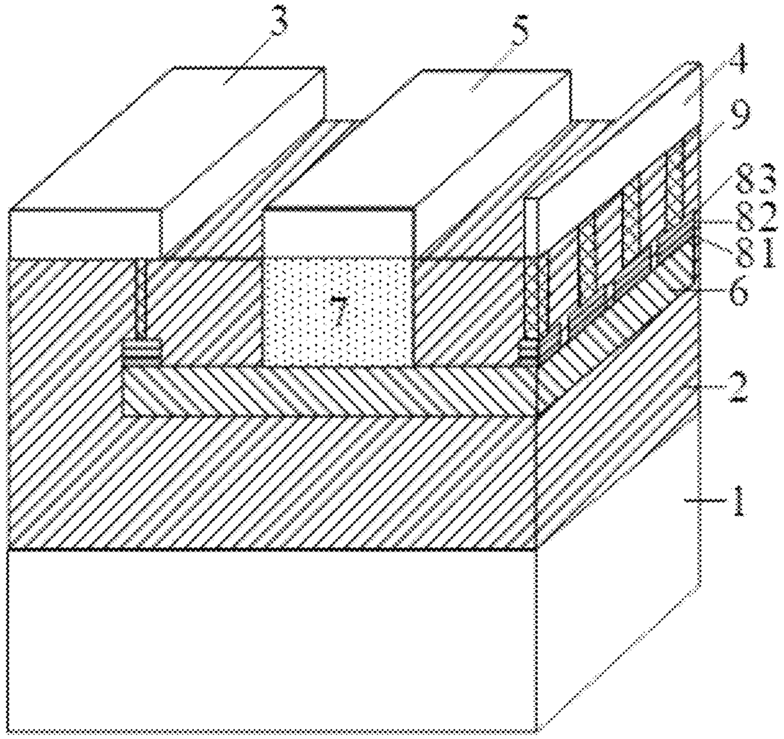

Referring to FIGS. 3A-3D, FIGS. 3A-3D illustrate the ferroelectric film phase shifter 30 proposed by the embodiment of the disclosure from different perspectives. Specifically, FIG. 3A illustrates a schematic diagram of an overall structure of the ferroelectric film phase shifter 30, which does not show the details of the internal structure, FIG. 3B is a schematic sectional view of the ferroelectric film phase shifter along a front view direction, FIG. 3C illustrates a schematic sectional view of the ferroelectric film phase shifter along a side view direction, and FIG. 3D illustrates a sectional schematic view of the ferroelectric film phase shifter along the front and side view directions, showing the details of the ferroelectric film phase shifter 30 proposed in the embodiment of the disclosure from multiple perspectives.

Correspondingly, the technological process of the ferroelectric film phase shifter 30 proposed by the embodiment of the disclosure is as follows.

Figure 4A:
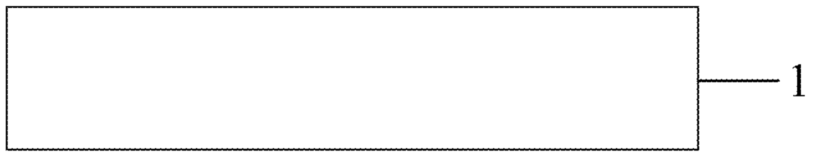
FIGS. 4A-4J illustrate schematic structural diagrams corresponding to a preparation process of the ferroelectric film phase shifter according to the embodiment of the disclosure.
Figure 4B:
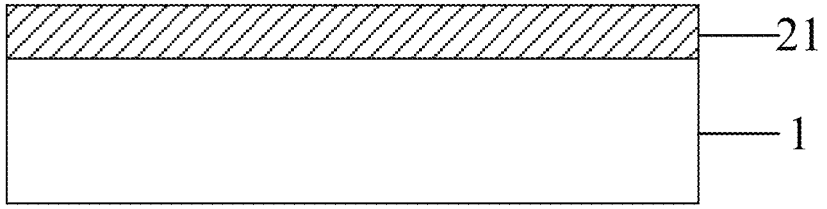

(1) One of P-type monocrystalline silicon, gallium arsenide and sapphire is selected as the substrate layer 1 as shown in FIG. 4A, and a thickness of the substrate layer 1 can be 10 μm to 1000 μm.

(2) A first isolated signal layer 21 is prepared on the substrate layer 1, and the preparation structure is shown in FIG. 4(*b*). Specifically, the first isolated signal layer 21 can be made of silicon dioxide, boron titanate, aluminum oxide, silicon nitride, or other materials, and is mainly selected according to the dielectric constant of the materials, so as to reduce the influence caused by the capacitance between the top transmission line electrodes (the first top transmission line electrode 3, the second top transmission line electrode 4 and the third top transmission line electrode 5) and the bottom transmission line electrode 6. Its preparation method can be pulsed laser deposition, chemical solution method, chemical vapor deposition method, atomic layer deposition, magnetron sputtering method, etc.

Figure 4C:
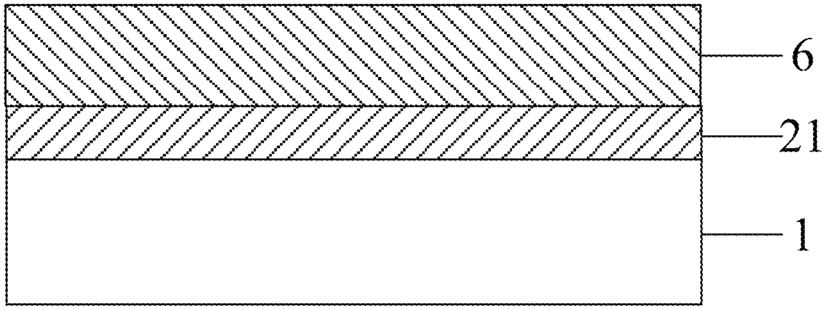

(3) The bottom transmission line electrode 6 is prepared on the first isolated signal layer 21, the preparation structure is shown in FIG. 4C, and its preparation method can be pulsed laser deposition, chemical solution method, chemical vapor deposition method, atomic layer deposition, magnetron sputtering method, etc.

Figure 4D:
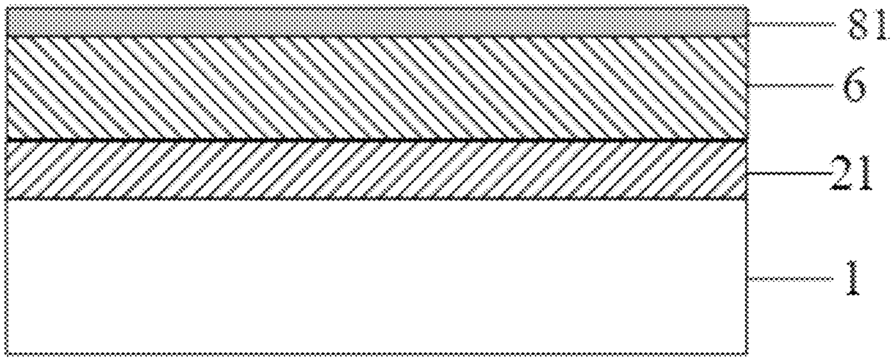
Figure 4E:
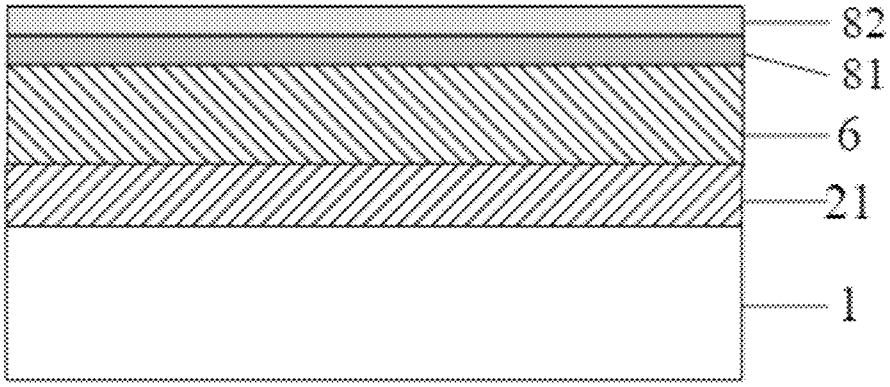
Figure 4F:
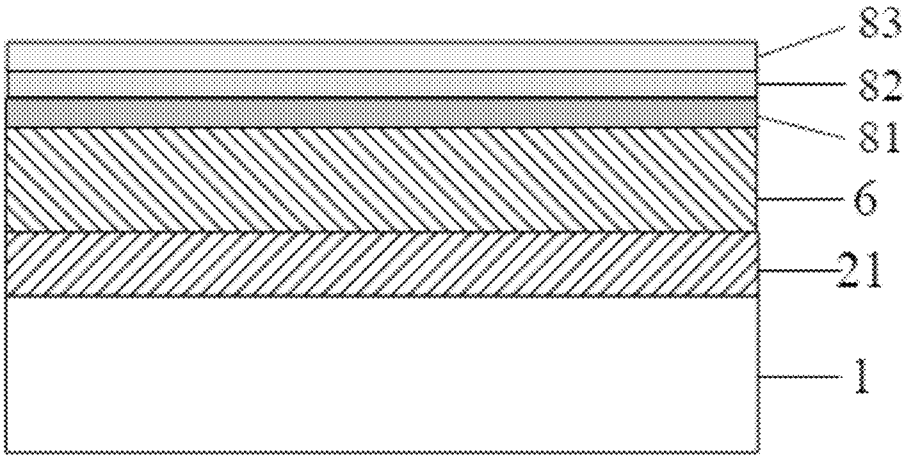

(4) As shown in FIG. 4D, FIG. 4E and FIG. 4F, for example, TiN, hafnium oxide and TiN are sequentially deposited on the bottom transmission line electrode 6 to form the MIM hafnium oxide-based ferroelectric capacitor structure 8. The MIM hafnium oxide-based ferroelectric capacitor structure 8 includes the first electrode layer 81, the MIM hafnium oxide ferroelectric film layer 82 and the second electrode layer 83. The preparation method can be pulsed laser deposition, chemical solution method, chemical vapor deposition method, atomic layer deposition method, magnetron sputtering method, etc. The overall thickness of the MIM hafnium oxide-based ferroelectric capacitor structure 8 is in a range of 23 nm to 280 nm, and the preparation temperature is in a range of 100° C.-400° C. After the preparation, rapid thermal annealing treatment is carried out at 400° C.-700° C. for 10 seconds (s)-100 s.

Figure 4G:
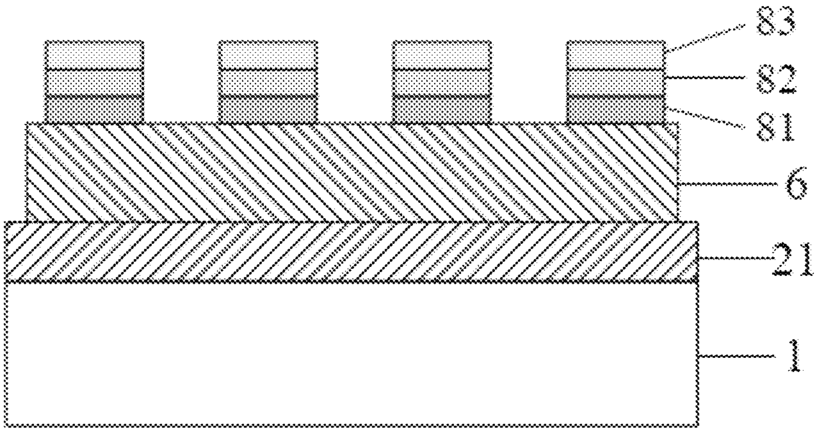

(5) The MIM hafnium oxide-based ferroelectric capacitor structure 8 and the bottom transmission line electrode 6 shown in FIG. 4F are patterned by photolithography technology, and the patterned structure is shown in FIG. 4G.

Figure 4H:
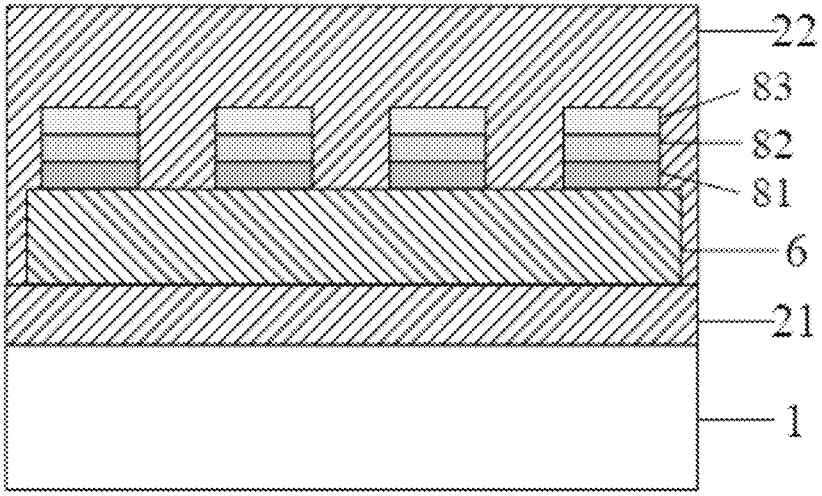

(6) A second isolated signal layer 22 is prepared on the first isolated signal layer 21, the bottom transmission line electrode 6 and the second electrode layer 83 shown in FIG. 4G, and the preparation structure is shown in FIG. 4H. The preparation process can be referred to the first isolated signal layer 21, which will not be detailed here. The first isolated signal layer 21 and the second isolated signal layer 22 constitute the isolated signal layer 2 shown in FIG. 1.

Figure 4I:
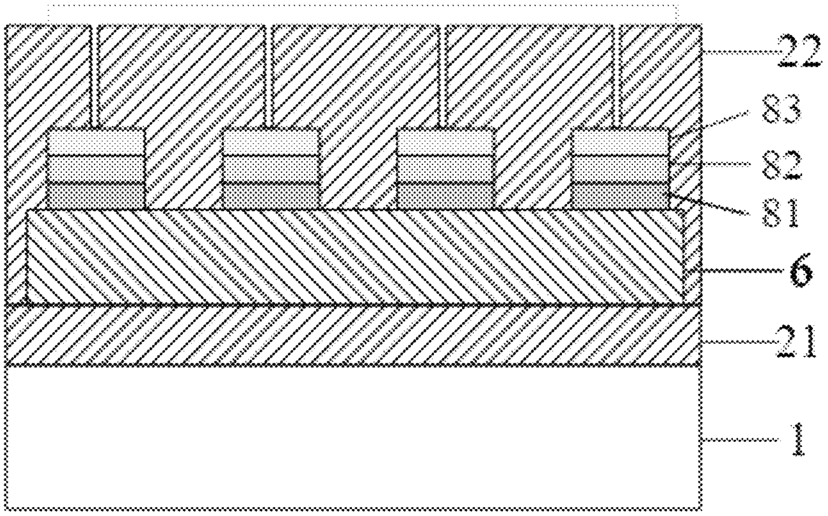

(7) the isolated signal layer 2 on each MIM hafnium oxide-based ferroelectric capacitor structure 8 shown in FIG. 4H is drilled by using the through-hole process, and positions of the metal transmission line structures 9 are etched as shown in FIG. 4I.

Figure 4J:
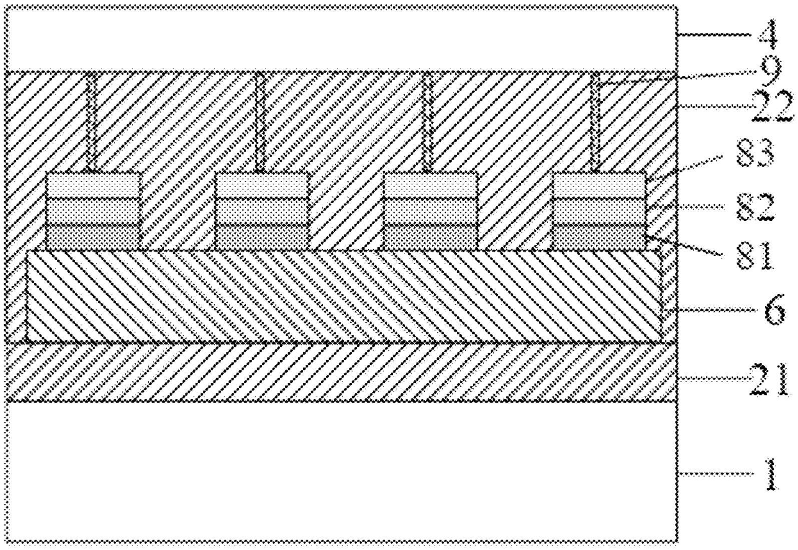

(8) The structure shown in FIG. 4I is patterned by photolithography on the isolated signal layer 2, and a position of the intermediate transmission line structure 7 (located under the position of the third top transmission line electrode 5) is etched (not shown in the figure). The first top transmission line electrode 3 (not shown in figure), the second top transmission line electrode 4 and the third top transmission line electrode 5 (not shown in figure) are patterned on the structure shown in FIG. 4I. The pulsed laser deposition, chemical solution method, chemical vapor deposition method, atomic layer deposition, magnetron sputtering method and the like are used, metal such as copper is deposited at the positions of the metal transmission line structures 9, the intermediate transmission line structure 7 (not shown in the figure), the first top transmission line electrode 3 (not shown in the figure), the second top transmission line electrode 4, and the third top transmission line electrode 5 (not shown in the figure) at one time, as shown in FIG. 4J, different metals can also be used to deposit different parts, thus completing the metal connection between the top transmission line electrodes and the MIM hafnium oxide-based ferroelectric capacitor structure 8.

In conclusion, the ferroelectric film phase shifter 30 proposed in the embodiment of the disclosure is a novel wafer-level phase shifter structure, which includes the substrate layer 1, the isolated signal layer 2, the first top transmission line electrode 3, the second top transmission line electrode 4, the third top transmission line electrode 5, the bottom transmission line electrode 6, the intermediate transmission line structure 7, the multiple hafnium oxide-based ferroelectric capacitor structures 8, and the multiple metal transmission line structures 9. The isolated signal layer 2 is located on the substrate layer 1. The first top transmission line electrode 3, the second top transmission line electrode 4 and the third top transmission line electrode 5 are distributed on the isolated signal layer 2 at intervals, the first top transmission line electrode 3 and the second top transmission line electrode 4 are located on the surfaces of the two ends of the isolated signal layer 2, and the third top transmission line electrode 5 is located on the surface of the middle region of the isolated signal layer 2. The bottom transmission line electrode 6 is located in the isolated signal layer 2. The intermediate transmission line structure 7 is located on the surface of the intermediate region of the bottom transmission line electrode 6 and is adjacent to the third top transmission line electrode 5. The multiple MIM hafnium oxide-based ferroelectric capacitor structures 8 are distributed on the surfaces of the two ends of the bottom transmission line electrode 6 and are all located below the first top transmission line electrode 3 and the second top transmission line electrode 4. The multiple metal transmission line structures 9 are located between the first top transmission line electrode 3 and each of the multiple MIM hafnium oxide-based ferroelectric capacitor structures 8, and between the second top transmission line electrode 4 and each of the multiple MIM hafnium oxide-based ferroelectric capacitor structure 8. It can be seen that the ferroelectric film phase shifter 30 proposed in the embodiment of the disclosure can realize wafer integration, and its preparation can be completely compatible with the existing CMOS process line. In addition, MIM hafnium oxide-based ferroelectric capacitor structure 8 has the advantages of low operating voltage, miniaturized film thickness, high high-frequency response speed and the like, which is beneficial to reducing the working voltage of the device, improving the device integration density and improving the device operating frequency band, and is of great significance to the development of phase shifter technology with large array, low power consumption, high precision and low loss.

Figure 5:
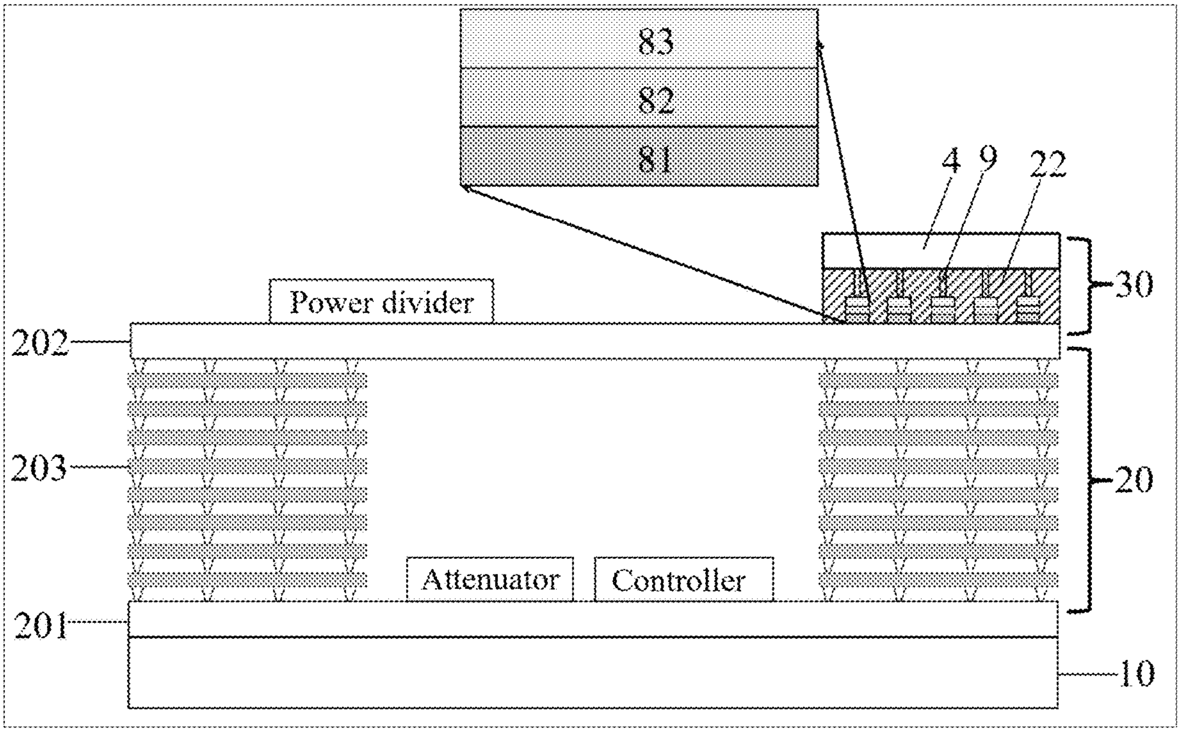
FIG. 5 illustrates a schematic structural diagram of a wafer-level phased array chip system according to an embodiment of the disclosure.

In the second aspect, referring to FIG. 5, an embodiment of the disclosure provides a wafer-level phased array chip system, including: a base plate and a ferroelectric film phase shifter array.

The substrate includes a silicon-based substrate 10, and a controller (also referred to as control unit), an attenuator, a power divider and a multilayer metal wiring structure 20 which are arranged on the silicon-based substrate 10 and designed according to the requirements of a phased array system.

The ferroelectric film phase shifter array is located on the multilayer metal wiring structure 20, and the ferroelectric film phase shifter array is an array composed of multiple ferroelectric film phase shifters 30 except the substrate layer in the first aspect.

In one embodiment of the disclosure, the wafer-level phased array chip system is formed by integrated tape-out of a silicon-based CMOS process line.

In one embodiment of the disclosure, the multilayer metal wiring structure 20 includes a top transmission line metal 202, a bottom transmission line metal 201, and multiple layered intermediate transmission line metals 203 located at two end regions between the top transmission line metal 202 and the bottom transmission line metal 201.

The power divider and the ferroelectric film phase shifter array are located at two end regions of the top transmission line metal 202.

The attenuator and the control unit are located in a middle region of the bottom transmission line metal 201.

Here, the bottom circuit designed according to the requirements of phased array system is not limited to the control unit, the attenuator and the power divider, but also includes logic unit, storage unit and other circuits needed for design, which is specifically designed according to the requirements of actual phased array system.

In the embodiment of the disclosure, the materials of the top transmission line metal 202, the bottom transmission line metal 201, and all the intermediate transmission line metals 203 include, but are not limited to, one or more of gold, platinum, silver, titanium, copper, aluminum, iron, and nickel, and all have a thickness of 50 nm to 1000 nm.

In the embodiment of the disclosure, the integration process temperature of each MIM hafnium oxide-based ferroelectric capacitor structure 8 in the ferroelectric film phase shifter array is not greater than 450° C.

In the embodiment of the disclosure, the phase shift response frequency of each MIM hafnium oxide-based ferroelectric capacitor structure 8 in the ferroelectric film phase shifter array is in a range of 1 Hz to 0.1 THz, and the operating voltage is in a range of 0 to 3 V.

Correspondingly, the preparation process of the wafer-level phased array chip system is introduced as follows.

Specifically, a CMOS process integrated substrate is prepared, which includes the integrated control unit, the attenuator, the power divider, and the multilayer metal wiring structure 20 as shown in FIG. 5 (excluding the film phase shifter structure 30 in FIG. 5), with the top transmission line metal 202 as the bottom transmission line electrode 6 in the film phase shifter structure 30. The subsequent preparation process can refer to FIG. 4D to FIG. 4J, except that FIG. 4D to FIG. 4J need not be provided with the substrate layer 1 and the first isolated signal layer 21, and the detailed process is not described here.

For the wafer-level phased array chip system of the embodiment of the second aspect, because it is basically similar to the ferroelectric film phase shifter 30 of the embodiment of the first aspect, the description is relatively simple, and the relevant points can only be found in the partial description of the ferroelectric film phase shifter 30 of the embodiment of the first aspect.

In the description of the disclosure, it should be understood that the terms "first" and "second" are only used for descriptive purposes and are not to be construed as indicating or implying relative importance or implying a number of indicated features. Therefore, the features defined as "first" and "second" may include one or more of these features explicitly or implicitly. In the description of the disclosure, "plural" means two or more, unless otherwise specifically defined.

Although the disclosure has been described herein in connection with various embodiments, in the process of implementing the claimed disclosure, those skilled in the art can understand and realize other variations of the disclosed embodiments by reviewing the specification and its drawings. In the specification, the word "comprising" does not exclude other components or steps, and "a" or "one" does not exclude plural cases. Some measures are recorded in different embodiments, but this does not mean that these measures cannot be combined to produce good results.

The above is a further detailed description of the disclosure combined with specific preferred embodiments, and it cannot be considered that the specific implementation of the disclosure is limited to these descriptions. For those skilled in the related art to which the disclosure belongs, several simple deductions or substitutions can be made without departing from the concept of the disclosure, all of which should be regarded as belonging to the protection scope of the disclosure.

What is claimed is:

1. A ferroelectric film phase shifter, comprising:

a substrate layer;

an isolated signal layer, located on the substrate layer;

a first top transmission line electrode, a second top transmission line electrode, and a third top transmission line electrode, distributed on the isolated signal layer at intervals; wherein the first top transmission line electrode and the second top transmission line electrode are located on surfaces of two ends of the isolated signal layer, and the third top transmission line electrode is located on a surface of a middle region of the isolated signal layer;

a bottom transmission line electrode, located in the isolated signal layer;

an intermediate transmission line structure, located on a surface of a middle region of the bottom transmission line electrode and adjacent to the third top transmission line electrode;

a plurality of metal-insulator-metal (MIM) hafnium oxide-based ferroelectric capacitor structures, distributed on surfaces of two ends of the bottom transmission line electrode and all located below the first top transmission line electrode and the second top transmission line electrode; and a plurality of metal transmission line structures, located between the first top transmission line electrode and each of the plurality of MIM hafnium oxide-based ferroelectric capacitor structures, and located between the second top transmission line electrode and each of the plurality of MIM hafnium oxide-based ferroelectric capacitor structures.

2. The ferroelectric film phase shifter as claimed in claim 1, wherein the isolated signal layer comprises one selected from the group consisting of silicon dioxide, boron titanate, aluminum oxide, and silicon nitride, and a thickness of the isolated signal layer is in a range of 500 nanometers (nm) to 10 micrometers (μm).

3. The ferroelectric film phase shifter as claimed in claim 1, wherein each of the plurality of MIM hafnium oxide-based ferroelectric capacitor structures comprises a first electrode layer, a hafnium oxide ferroelectric film layer and a second electrode layer stacked and distributed from bottom to top.

4. The ferroelectric film phase shifter as claimed in claim 3, wherein electrode materials of the first electrode layer and the second electrode layer both comprise at least one selected from the group consisting of titanium nitride (TiN), tungsten (W), hafnium nitride (HfN), tantalum nitride (TaN), nickel (Ni) and ruthenium (Ru), and thicknesses of the first electrode layer and the second electrode layer are in a range of 10 nm to 100 nm; the hafnium oxide ferroelectric film layer is one of a doped hafnium oxide ferroelectric film and an undoped hafnium oxide ferroelectric film, and a doping material of the doped hafnium oxide ferroelectric film comprises at least one selected from the group consisting of silicon, zirconium, aluminum, lanthanum, yttrium, cerium, nitrogen and praseodymium; a length and a width of the hafnium oxide ferroelectric film layer are both in a range of 500 nm to 2000 nm when viewed along a top view direction; and a thickness of the hafnium oxide ferroelectric film layer is in a range of 3 nm to 80 nm when viewed from front and side view directions.

5. The ferroelectric film phase shifter as claimed in claim 1, wherein a phase shift response frequency of the MIM hafnium oxide-based ferroelectric capacitor structure is in a range of 1 hertz (Hz) to 0.1 terahertz (THz), and a working voltage of the MIM hafnium oxide-based ferroelectric capacitor structure is in a range of 0 to 3 volts (V).

6. A wafer-level phased array chip system, comprising:

a base plate; wherein the base plate comprises a silicon-based substrate, and a controller, an attenuator, a power divider and a multilayer metal wiring structure arranged on the silicon-based substrate and designed according to requirements of the wafer-level phased array chip system; and a ferroelectric film phase shifter array, located on the multilayer metal wiring structure, wherein the ferroelectric film phase shifter array is an array composed of a plurality of ferroelectric film phase shifters, and each of the plurality of ferroelectric film phase shifters comprises:

an isolated signal layer, located on the substrate layer;

a first top transmission line electrode, a second top transmission line electrode, and a third top transmission line electrode, distributed on the isolated signal layer at intervals; wherein the first top transmission line electrode and the second top transmission line electrode are located on surfaces of two ends of the isolated signal layer, and the third top transmission line electrode is located on a surface of a middle region of the isolated signal layer;

a bottom transmission line electrode, located below the isolated signal layer and adjacent to the isolated signal layer;

an intermediate transmission line structure, located in the isolated signal layer and adjacent to the bottom transmission line electrode and the third top transmission line electrode;

a plurality of MIM hafnium oxide-based ferroelectric capacitor structures, located in the isolated signal layer and distributed on surfaces of two ends of the bottom transmission line electrode; wherein the plurality of MIM hafnium oxide-based ferroelectric capacitor structures are disposed below the first top transmission line electrode and the second top transmission line electrode; and a plurality of metal transmission line structures, located between the first top transmission line electrode and each of the plurality of MIM hafnium oxide-based ferroelectric capacitor structures, and located between the second top transmission line electrode and each of the plurality of MIM hafnium oxide-based ferroelectric capacitor structures.

7. The wafer-level phased array chip system as claimed in claim 6, wherein the multilayer metal wiring structure comprises a top transmission line metal, a bottom transmission line metal, and a plurality of intermediate transmission line metals stacked and distributed at two end regions between the top transmission line metal and the bottom transmission line metal;

the power divider and the ferroelectric film phase shifter array are located at two end regions on the top transmission line metal, and the bottom transmission line electrode of each of the plurality of ferroelectric film phase shifters of the ferroelectric film phase shifter array is the top transmission line metal; and the attenuator and the controller are located on a middle region of the bottom transmission line metal.

8. The wafer-level phased array chip system as claimed in claim 6, wherein the wafer-level phased array chip system is formed by integrated tape-out of a silicon-based complementary metal oxide semiconductor (CMOS) process line.

9. The wafer-level phased array chip system as claimed in claim 6, wherein an integration process temperature of each of the plurality of MIM hafnium oxide-based ferroelectric capacitor structures in the ferroelectric film phase shifter array is not greater than 450° C.

10. The wafer-level phased array chip system as claimed in claim 6, wherein a phase shift response frequency of each of the plurality of MIM hafnium oxide-based ferroelectric capacitor structures in the ferroelectric film phase shifter array is in a range of 1 Hz to 0.1 THz, and a working voltage of each of the plurality of MIM hafnium oxide-based ferroelectric capacitor structures in the ferroelectric film phase shifter array is in a range of 0 to 3 V.

11. The wafer-level phased array chip system as claimed in claim 6, wherein each of the plurality of MIM hafnium oxide-based ferroelectric capacitor structures comprises a first electrode layer, a hafnium oxide ferroelectric film layer and a second electrode layer stacked and distributed from bottom to top.

12. The wafer-level phased array chip system as claimed in claim 11, wherein electrode materials of the first electrode layer and the second electrode layer of the ferroelectric film phase shifter array both comprise at least one selected from the group consisting of TiN, W, HfN, TaN, Ni and Ru, and thicknesses of the first electrode layer and the second electrode layer are in a range of 10 nm to 100 nm; the hafnium oxide ferroelectric film layer is one of a doped hafnium oxide ferroelectric film and an undoped hafnium oxide ferroelectric film, and a doping material of the doped hafnium oxide ferroelectric film comprises at least one selected from the group consisting of silicon, zirconium, aluminum, lanthanum, yttrium, cerium, nitrogen and praseodymium; a length and a width of the hafnium oxide ferroelectric film layer are both in a range of 500 nm to 2000 nm when viewed along a top view direction; and a thickness of the hafnium oxide ferroelectric film layer is in a range of 3 nm to 80 nm when viewed from front and side view directions.

* * * * *